United States Patent
Lee et al.

(10) Patent No.: US 11,889,539 B2
(45) Date of Patent: Jan. 30, 2024

(54) METHOD AND APPARATUS FOR PERFORMING SEMI PERSISTENT SCHEDULING TRANSMISSION WITH SCHEDULING REQUEST IN WIRELESS COMMUNICATION SYSTEM

(71) Applicant: LG ELECTRONICS INC., Seoul (KR)

(72) Inventors: Youngdae Lee, Seoul (KR); Sunghoon Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/817,716

(22) Filed: Aug. 5, 2022

(65) Prior Publication Data

US 2022/0394730 A1    Dec. 8, 2022

Related U.S. Application Data

(63) Continuation of application No. 16/071,423, filed as application No. PCT/KR2017/001140 on Feb. 2, 2017, now Pat. No. 11,432,307.

(Continued)

(51) Int. Cl.
*H04W 72/50* (2023.01)
*H04W 72/23* (2023.01)
(Continued)

(52) U.S. Cl.
CPC ........... *H04W 72/535* (2023.01); *H04W 4/40* (2018.02); *H04W 72/1273* (2013.01); *H04W 72/23* (2023.01)

(58) Field of Classification Search
CPC . H04W 72/535; H04W 4/40; H04W 72/1273; H04W 72/23; H04W 72/12; H04W 72/11; H04W 72/04
See application file for complete search history.

(56) References Cited

U.S. PATENT DOCUMENTS

2008/0310356 A1    12/2008 Cai et al.
2009/0054006 A1    2/2009 Cai et al.
(Continued)

FOREIGN PATENT DOCUMENTS

WO    2017-016606    2/2017

OTHER PUBLICATIONS

PCT International Application No. PCT/KR2017/001140, International Search Report dated May 10, 2017, 2 pages.
(Continued)

*Primary Examiner* — Un C Cho
*Assistant Examiner* — Lalita W Pace
(74) *Attorney, Agent, or Firm* — LEE, HONG, DEGERMAN, KANG & WAIMEY

(57) ABSTRACT

A user equipment (UE) receives a grant on a semi-persistent scheduling (SPS) resource from an eNodeB (eNB). The UE determines that the SPS resource cannot accommodate an amount of data available for transmission for a specific logical channel. The UE transmits the SPS scheduling information for the specific logical channel to the eNB. The SPS scheduling information for the specific logical channel may be a scheduling request for the specific logical channel, and may be transmitted on an additional L1 control resource.

20 Claims, 9 Drawing Sheets

Related U.S. Application Data

(60) Provisional application No. 62/290,936, filed on Feb. 3, 2016.

(51) Int. Cl.
*H04W 4/40* (2018.01)
*H04W 72/1273* (2023.01)

(56) References Cited

U.S. PATENT DOCUMENTS

| | | |
|---|---|---|
| 2009/0197610 A1 | 8/2009 | Chun et al. |
| 2009/0238120 A1 | 9/2009 | Cai et al. |
| 2010/0040028 A1 | 2/2010 | Maheshwari et al. |
| 2010/0077100 A1 | 3/2010 | Hsu et al. |
| 2010/0272045 A1 | 10/2010 | Hsu |
| 2012/0044891 A1 | 2/2012 | Yang et al. |
| 2012/0155416 A1 | 6/2012 | Zhang et al. |
| 2013/0039286 A1 | 2/2013 | Larsson et al. |
| 2013/0100936 A1 | 4/2013 | Pettersson |
| 2014/0036885 A1 | 2/2014 | Moberg et al. |
| 2014/0254410 A1* | 9/2014 | Seo .............. H04L 5/0055 370/252 |
| 2015/0282148 A1* | 10/2015 | Le .............. H04W 72/20 370/329 |
| 2015/0382372 A1 | 12/2015 | Vajapeyam et al. |
| 2016/0242176 A1 | 8/2016 | Sun et al. |
| 2017/0026942 A1 | 1/2017 | Vajapeyam et al. |
| 2019/0014506 A1* | 1/2019 | Li .............. H04W 4/70 |
| 2019/0174522 A1 | 6/2019 | Xiao et al. |
| 2021/0212088 A1 | 7/2021 | Lee et al. |

OTHER PUBLICATIONS

United States Patent and Trademark Office U.S. Appl. No. 16/071,423, Office Action dated May 7, 2021, 17 pages.

United States Patent and Trademark Office U.S. Appl. No. 16/071,423, Final Office Action dated Aug. 6, 2021, 15 pages.

United States Patent and Trademark Office U.S. Appl. No. 16/071,423, Advisory Action dated Oct. 7, 2021, 4 pages.

United States Patent and Trademark Office U.S. Appl. No. 16/071,423, Office Action dated Dec. 24, 2021, 14 pages.

United States Patent and Trademark Office U.S. Appl. No. 16/071,423, Notice of Allowance dated Apr. 29, 2022, 8 pages.

Duan et al., "An Improved Approach of Sending BSR and SR Based on MAC Layer in LTE System," 2011 International Conference on Business Computing and Global Informatization, 2011, pp. 520-523 (Year; 2011).

* cited by examiner

METHOD AND APPARATUS FOR PERFORMING SEMI PERSISTENT SCHEDULING TRANSMISSION WITH SCHEDULING REQUEST IN WIRELESS COMMUNICATION SYSTEM

CROSS-REFERENCE TO RELATED APPLICATIONS

This application is a continuation of U.S. patent application Ser. No. 16/071,423, filed on Jul. 19, 2018, which is the National Stage filing under 35 U.S.C. 371 of International Application No. PCT/KR2017/001140, filed on Feb. 2, 2017, which claims the benefit of U.S. Provisional Application No. 62/290,936, filed on Feb. 3, 2016, the contents of which are all hereby incorporated by reference herein in their entirety.

BACKGROUND OF THE INVENTION

Field of the Invention

The present invention relates to wireless communications, and more particularly, to a method and apparatus for performing a semi-persistent scheduling (SPS) transmission with a scheduling request in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

The pace of LTE network deployment is accelerating all over the world, which enables more and more advanced services and Internet applications making use of the inherent benefits of LTE, such as higher data rate, lower latency and enhanced coverage. Widely deployed LTE-based network provides the opportunity for the vehicle industry to realize the concept of 'connected cars'. By providing a vehicle with an access to the LTE network, a vehicle can be connected to the Internet and other vehicles so that a broad range of existing or new services can be envisaged. Vehicle manufacturers and cellular network operators show strong interests in vehicle wireless communications for proximity safety services as well as commercial applications. LTE-based vehicle-to-everything (V2X) study is urgently desired from market requirement, and the market for vehicle-to-vehicle (V2V) communication in particular is time sensitive. There are many research projects and field tests of connected vehicles in some countries or regions, such as US/Europe/Japan/Korea.

V2X includes a vehicle-to-vehicle (V2V), covering LTE-based communication between vehicles, vehicle-to-pedestrian (V2P), covering LTE-based communication between a vehicle and a device carried by an individual (e.g. handheld terminal carried by a pedestrian, cyclist, driver or passenger), and vehicle-to-infrastructure/network (V2I), covering LTE-based communication between a vehicle and a roadside unit (RSU)/network. A RSU is a transportation infrastructure entity (e.g. an entity transmitting speed notifications) implemented in an eNodeB (eNB) or a stationary UE.

SUMMARY OF THE INVENTION

The present invention provides a method and apparatus for performing a semi-persistent scheduling (SPS) transmission with a scheduling request in a wireless communication system. The present invention provides a method and apparatus for configuring SPS resource and L1 control resource which may be used to request additional resource over the SPS resource.

In an aspect, a method for transmitting semi-persistent scheduling (SPS) scheduling information, by a user equipment (UE), in a wireless communication system is provided. The method includes receiving a grant on a SPS resource from an eNodeB (eNB), determining that the SPS resource cannot accommodate an amount of data available for transmission for a specific logical channel, and transmitting the SPS scheduling information for the specific logical channel to the eNB.

In another aspect, a user equipment (UE) in a wireless communication system is provided. The UE includes a memory, a transceiver, and a processor, coupled to the memory and the transceiver, that controls the transceiver to receive ng a grant on a SPS resource, determines that the SPS resource cannot accommodate an amount of data available for transmission for a specific logical channel, and controls the transceiver to transmit the SPS scheduling information for the specific logical channel.

A scheduling request for a specific logical channel can be configured.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

For clarity, the following description will focus on the LTE-A. However, technical features of the present invention are not limited thereto.

Figure 1:
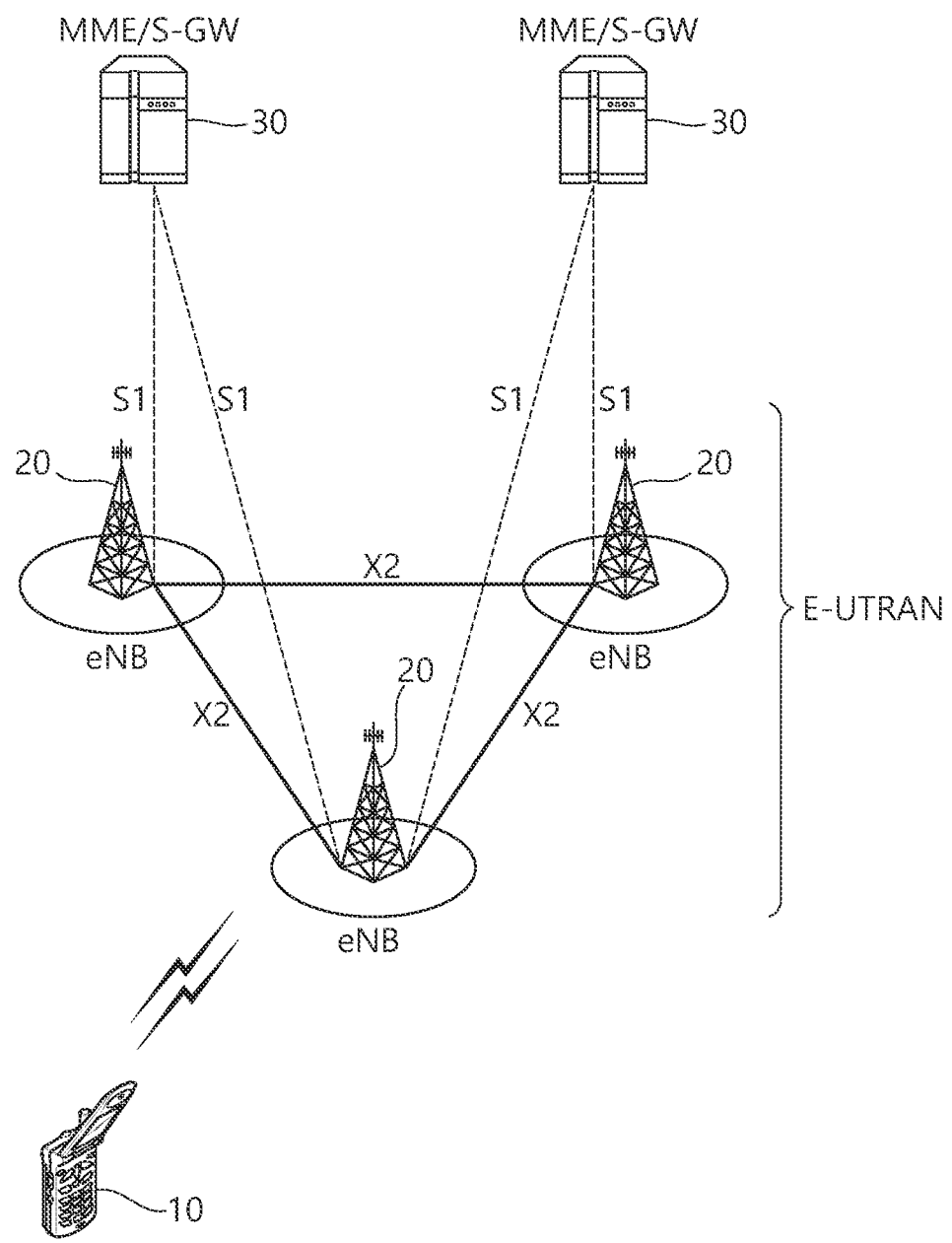
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), an access point, etc. One eNB 20 may be deployed per cell.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) and a serving gateway (S-GW). The MME/S-GW 30 may be positioned at the end of the network. For clarity, MME/S-GW 30 will be referred to herein simply as a "gateway," but it is understood that this entity includes both the MME and S-GW. A packet data network (PDN) gateway (P-GW) may be connected to an external network.

The MME provides various functions including non-access stratum (NAS) signaling to eNBs 20, NAS signaling security, access stratum (AS) security control, inter core network (CN) node signaling for mobility between 3GPP access networks, idle mode UE reachability (including control and execution of paging retransmission), tracking area list management (for UE in idle and active mode), packet data network (PDN) gateway (P-GW) and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on access point name aggregate maximum bit rate (APN-AMBR).

Interfaces for transmitting user traffic or control traffic may be used. The UE 10 is connected to the eNB 20 via a Uu interface. The eNBs 20 are connected to each other via an X2 interface. Neighboring eNBs may have a meshed network structure that has the X2 interface. A plurality of nodes may be connected between the eNB 20 and the gateway 30 via an S1 interface.

Figure 2:
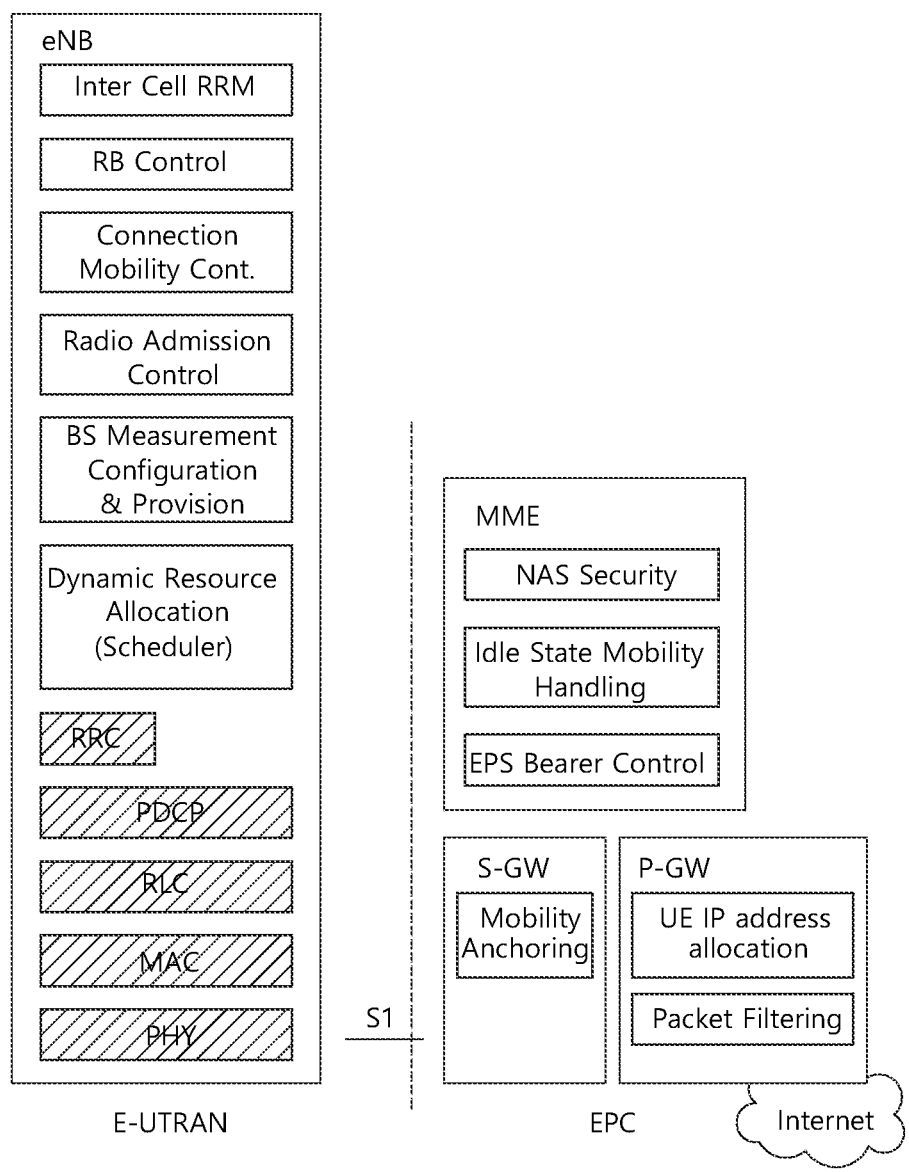
FIG. 2 shows a block diagram of architecture of a typical E-UTRAN and a typical EPC.

FIG. 2 shows a block diagram of architecture of a typical E-UTRAN and a typical EPC. Referring to FIG. 2, the eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 3:
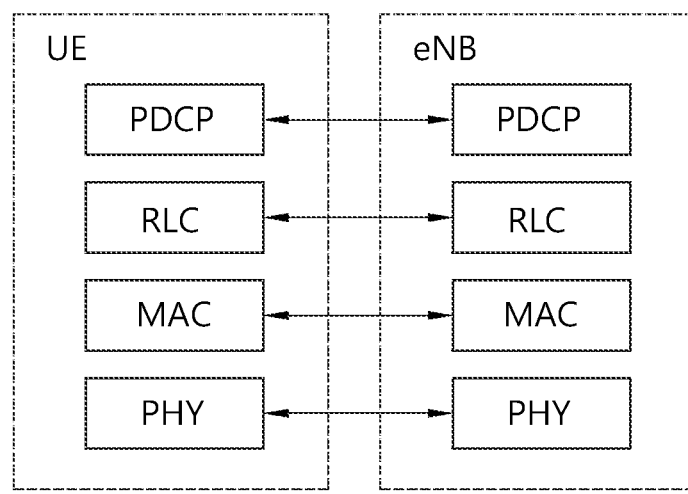
FIG. 3 shows a block diagram of a user plane protocol stack of an LTE system.
Figure 4:
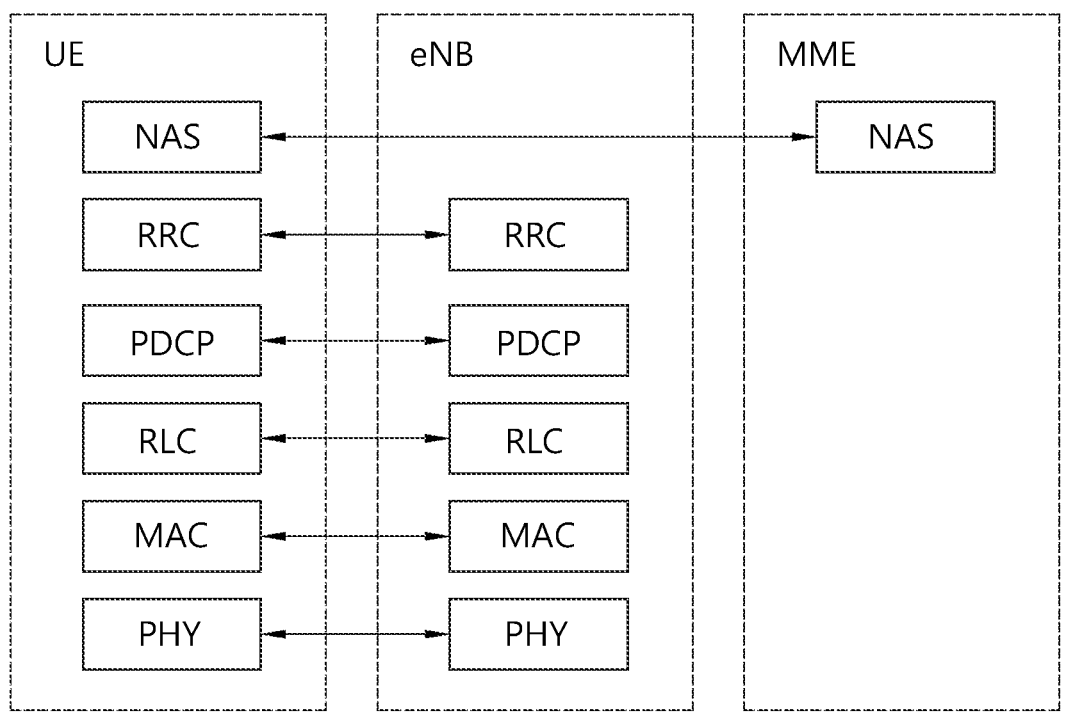
FIG. 4 shows a block diagram of a control plane protocol stack of an LTE system.

FIG. 3 shows a block diagram of a user plane protocol stack of an LTE system. FIG. 4 shows a block diagram of a control plane protocol stack of an LTE system. Layers of a radio interface protocol between the UE and the E-UTRAN may be classified into a first layer (L1), a second layer (L2), and a third layer (L3) based on the lower three layers of the open system interconnection (OSI) model that is well-known in the communication system.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data between the MAC layer and the PHY layer is transferred through the transport channel. Between different PHY layers, i.e., between a PHY layer of a transmission side and a PHY layer of a reception side, data is transferred via the physical channel.

A MAC layer, a radio link control (RLC) layer, and a packet data convergence protocol (PDCP) layer belong to the L2. The MAC layer provides services to the RLC layer, which is a higher layer of the MAC layer, via a logical channel. The MAC layer provides data transfer services on logical channels. The RLC layer supports the transmission of data with reliability. Meanwhile, a function of the RLC layer may be implemented with a functional block inside the MAC layer. In this case, the RLC layer may not exist. The PDCP layer provides a function of header compression function that reduces unnecessary control information such that data being transmitted by employing IP packets, such as IPv4 or Ipv6, can be efficiently transmitted over a radio interface that has a relatively small bandwidth.

A radio resource control (RRC) layer belongs to the L3. The RLC layer is located at the lowest portion of the L3, and is only defined in the control plane. The RRC layer controls logical channels, transport channels, and physical channels in relation to the configuration, reconfiguration, and release of radio bearers (RBs). The RB signifies a service provided the L2 for data transmission between the UE and E-UTRAN.

Referring to FIG. 3, the RLC and MAC layers (terminated in the eNB on the network side) may perform functions such as scheduling, automatic repeat request (ARQ), and hybrid ARQ (HARM). The PDCP layer (terminated in the eNB on the network side) may perform the user plane functions such as header compression, integrity protection, and ciphering.

Referring to FIG. 4, the RLC and MAC layers (terminated in the eNB on the network side) may perform the same functions for the control plane. The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Figure 5:
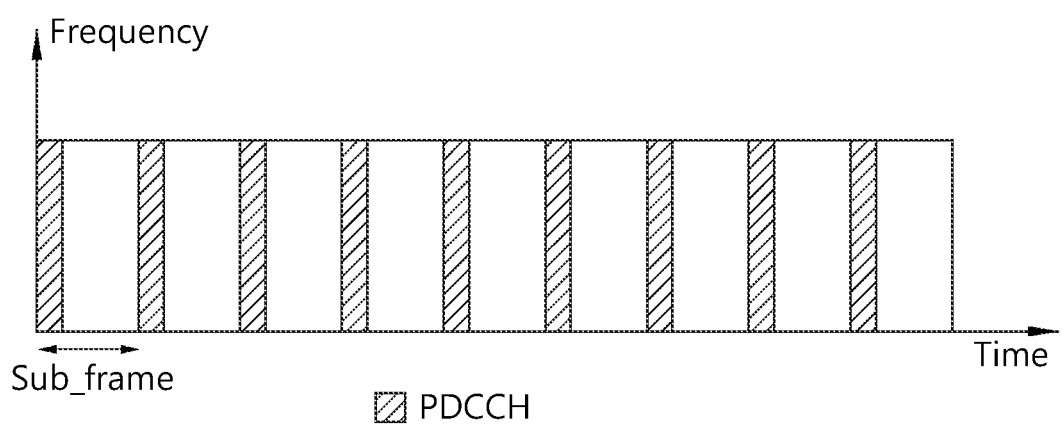
FIG. 5 shows an example of a physical channel structure.

FIG. 5 shows an example of a physical channel structure. A physical channel transfers signaling and data between PHY layer of the UE and eNB with a radio resource. A physical channel consists of a plurality of subframes in time domain and a plurality of subcarriers in frequency domain. One subframe, which is 1 ms, consists of a plurality of symbols in the time domain. Specific symbol(s) of the subframe, such as the first symbol of the subframe, may be used for a physical downlink control channel (PDCCH). The PDCCH carries dynamic allocated resources, such as a physical resource block (PRB) and modulation and coding scheme (MCS).

A DL transport channel includes a broadcast channel (BCH) used for transmitting system information, a paging channel (PCH) used for paging a UE, a downlink shared channel (DL-SCH) used for transmitting user traffic or control signals, a multicast channel (MCH) used for multicast or broadcast service transmission. The DL-SCH supports HARQ, dynamic link adaptation by varying the modulation, coding and transmit power, and both dynamic and semi-static resource allocation. The DL-SCH also may enable broadcast in the entire cell and the use of beamforming.

A UL transport channel includes a random access channel (RACH) normally used for initial access to a cell, an uplink shared channel (UL-SCH) for transmitting user traffic or control signals, etc. The UL-SCH supports HARQ and dynamic link adaptation by varying the transmit power and potentially modulation and coding. The UL-SCH also may enable the use of beamforming.

The logical channels are classified into control channels for transferring control plane information and traffic channels for transferring user plane information, according to a type of transmitted information. That is, a set of logical channel types is defined for different data transfer services offered by the MAC layer.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting multimedia broadcast multicast services (MBMS) control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RRC state indicates whether an RRC layer of the UE is logically connected to an RRC layer of the E-UTRAN. The RRC state may be divided into two different states such as an RRC idle state (RRC_IDLE) and an RRC connected state (RRC_CONNECTED). In RRC_IDLE, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE, no RRC context is stored in the eNB.

In RRC_CONNECTED, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion. A paging message is transmitted over all cells belonging to the same tracking area. If the UE moves from one tracking area (TA) to another TA, the UE will send a tracking area update (TAU) message to the network to update its location.

Semi-persistent scheduling (SPS) is described. E-UTRAN can allocate semi-persistent DL resources for the first HARQ transmissions to UEs. RRC defines the periodicity of the semi-persistent DL grant. PDCCH indicates whether the DL grant is a semi-persistent one, i.e. whether it can be implicitly reused in the following TTIs according to the periodicity defined by RRC.

When required, retransmissions are explicitly signaled via the PDCCH(s). In the subframes where the UE has semi-persistent DL resource, if the UE cannot find its cell radio network temporary identity (C-RNTI) on the PDCCH(s), a DL transmission according to the semi-persistent allocation that the UE has been assigned in the TTI is assumed. Otherwise, in the subframes where the UE has semi-persistent DL resource, if the UE finds its C-RNTI on the PDCCH(s), the PDCCH allocation overrides the semi-persistent allocation for that TTI and the UE does not decode the semi-persistent resources.

When carrier aggregation (CA) is configured, semi-persistent DL resources can only be configured for the primary cell (PCell) and only PDCCH allocations for the PCell can override the semi-persistent allocation. When dual connectivity (DC) is configured, semi-persistent DL resources can only be configured for the PCell or primary secondary cell (PSCell). Only PDCCH allocations for the PCell can override the semi-persistent allocation for PCell and only PDCCH allocations for the PSCell can override the semi-persistent allocation for PSCell.

In addition, E-UTRAN can allocate a semi-persistent UL resource for the first HARQ transmissions and potentially retransmissions to UEs. RRC defines the periodicity of the semi-persistent UL grant. PDCCH indicates whether the UL grant is a semi-persistent one, i.e. whether it can be implicitly reused in the following TTIs according to the periodicity defined by RRC.

In the subframes where the UE has semi-persistent UL resource, if the UE cannot find its C-RNTI on the PDCCH(s), a UL transmission according to the semi-persistent allocation that the UE has been assigned in the TTI can be made. The network performs decoding of the pre-defined PRBs according to the pre-defined MCS. Otherwise, in the subframes where the UE has semi-persistent UL resource, if the UE finds its C-RNTI on the PDCCH(s), the PDCCH allocation overrides the persistent allocation for that TTI and the UE's transmission follows the PDCCH allocation, not the semi-persistent allocation. Retransmissions are either implicitly allocated in which case the UE uses the semi-persistent UL allocation, or explicitly allocated via PDCCH(s) in which case the UE does not follow the semi-persistent allocation.

Similarly as for the DL, semi-persistent UL resources can only be configured for the PCell and only PDCCH allocations for the PCell can override the semi-persistent allocation. When DC is configured, semi-persistent UL resources can only be configured for the PCell or PSCell. Only PDCCH allocations for the PCell can override the semi-persistent allocation for PCell and only PDCCH allocations for the PSCell can override the semi-persistent allocation for PSCell.

When SPS is enabled by RRC, the following information is provided:
  SPS C-RNTI;
  UL SPS interval semiPersistSchedIntervalUL and number of empty transmissions before implicit release implicitReleaseAfter, if SPS is enabled for the UL;
  Whether twoIntervalsConfig is enabled or disabled for UL, only for time division duplex (TDD);
  DL SPS interval semiPersistSchedIntervalDL and number of configured HARQ processes for SPS numberOfConfSPS-Processes, if SPS is enabled for the DL;

When SPS for UL or DL is disabled by RRC, the corresponding configured grant or configured assignment shall be discarded.

The above information may be carried in SPS-Config information element (IE). The IE SPS-Config is used to specify the SPS configuration. Table 1 shows the SPS-Config IE.

TABLE 1

```
-- ASN1START
SPS-Config ::=                    SEQUENCE {
    semiPersistSchedC-RNTI            C-RNTI              OPTIONAL, -- Need OR
    sps-ConfigDL                      SPS-ConfigDL        OPTIONAL, -- Need ON
    sps-ConfigUL                      SPS-ConfigUL        OPTIONAL -- Need ON
}
SPS-ConfigDL ::=                  CHOICE{
    release                           NULL,
    setup                             SEQUENCE {
        semiPersistSchedIntervalDL        ENUMERATED {
                                              sf10, sf20, sf32, sf40, sf64, sf80,
                                              sf128, sf160, sf320, sf640, spare6,
                                              spare5, spare4, spare3, spare2,
                                              spare1},
        numberOfConfSPS-Processes         INTEGER (1..8),
        n1PUCCH-AN-PersistentList         N1PUCCH-AN-PersistentList,
        ...,
        [[ twoAntennaPortActivated-r10          CHOICE {
            release                                 NULL,
            setup                                   SEQUENCE {
                n1PUCCH-AN-PersistentListP1-r10         N1PUCCH-AN-PersistentList
            }
        }                                                           OPTIONAL -- Need ON
        ]]
    }
}
SPS-ConfigUL ::=                  CHOICE {
    release                           NULL,
    setup                             SEQUENCE {
        semiPersistSchedIntervalUL        ENUMERATED {
                                              sf10, sf20, sf32, sf40, sf64, sf80,
                                              sf128, sf160, sf320, sf640, spare6,
                                              spare5, spare4, spare3, spare2,
                                              spare1},
```

TABLE 1-continued

```
    implicitReleaseAfter              ENUMERATED {e2, e3, e4, e8},
    p0-Persistent                     SEQUENCE {
        p0-NominalPUSCH-Persistent            INTEGER (-126..24),
        p0-UE-PUSCH-Persistent                INTEGER (-8..7)
    }                                                               OPTIONAL, -- Need OP
    twoIntervalsConfig                ENUMERATED {true}             OPTIONAL, -- Cond TDD
    ...,
    [[ p0-PersistentSubframeSet2-r12              CHOICE {
        release                                       NULL,
        setup                                         SEQUENCE {
            p0-NominalPUSCH-PersistentSubframeSet2-r12    INTEGER (-126..24),
            p0-UE-PUSCH-PersistentSubframeSet2-r12        INTEGER (-8..7)
        }
    }                                                               OPTIONAL -- Need ON
    ]]
    }
}
N1PUCCH-AN-PersistentList ::=                 SEQUENCE (SIZE (1..4)) OF INTEGER (0..2047)
-- ASN1STOP
```

As described above, the SPS-Config IE may include at least one of SPS C-RNTI (semiPersistSchedC-RNTI), UL SPS interval (semiPersistSchedIntervalUL) and number of empty transmissions before implicit release (implicitReleaseAfter), whether twoIntervalsConfig is enabled or disabled for UL (twoIntervalsConfig), and DL SPS interval (semiPersistSchedIntervalDL) and number of configured HARQ processes for SPS (numberOfConfSPS-Processes), if SPS is enabled for the DL.

The SPS-Config IE may be included in RadioResourceConfigDedicated IE. The IE RadioResourceConfigDedicated is used to setup/modify/release RBs, to modify the MAC main configuration, to modify the SPS configuration and to modify dedicated physical configuration. The RadioResourceConfigDedicated IE may be included in one of RRCConnectionReconfiguration message, RRCConnectionReestablishment message, or RRCConnectionSetup message. Table 2 shows The RadioResourceConfigDedicated IE.

Referring to Table 2, the RadioResourceConfigDedicated IE may include The SPS-Config IE. Except for handover or releasing SPS for master cell group (MCG), E-UTRAN does not reconfigure SPS-Config for MCG when there is a configured DL assignment or a configured UL grant for MCG. Except for SCG change or releasing SPS for SCG, E-UTRAN does not reconfigure SPS-Config for SCG when there is a configured DL assignment or a configured UL grant for SCG.

After a SPS DL assignment is configured, the MAC entity shall consider sequentially that the $N^{th}$ assignment occurs in the subframe for which:

(10*SFN+subframe)=[(10*SFN$_{start\ time}$+subframe$_{start\ time}$)+N*semiPersistSchedIntervalDL] modulo 10240, where SFN$_{start\ time}$ and subframe$_{start\ time}$ are the system frame number (SFN) and subframe, respectively, at the time the configured DL assignment were (re-) initialized.

TABLE 2

```
-- ASN1START
RadioResourceConfigDedicated ::= SEQUENCE {
    srb-ToAddModList        SRB-ToAddModList            OPTIONAL, -- Cond HO-Conn
    drb-ToAddModList        DRB-ToAddModList            OPTIONAL, -- Cond HO-toEUTRA
    drb-ToReleaseList       DRB-ToReleaseList                     OPTIONAL, -- Need ON
    mac-MainConfig          CHOICE {
        explicitValue           MAC-MainConfig,
        defaultValue            NULL        OPTIONAL, -- Cond HO-toEUTRA2
    sps-Config              SPS-Config                            OPTIONAL,-- Need ON
    physicalConfigDedicated PhysicalConfigDedicated               OPTIONAL, -- Need ON
    ...,
    [[ rlf-TimersAndConstants-r9        RLF-TimersAndConstants-r9    OPTIONAL -- Need ON
    ]],
    [[ measSubframePatternPCell-r10     MeasSubframePatternPCell-r10 OPTIONAL -- Need ON
    ]],
    [[ neighCellsCRS-Info-r11           NeighCellsCRS-Info-r11       OPTIONAL -- Need ON
    ]],
    [[ naics-Info-r12                   NAICS-AssistanceInfo-r12     OPTIONAL -- Need ON
    ]]}
RadioResourceConfigDedicatedPSCell-r12 ::= SEQUENCE {
-- UE specific configuration extensions applicable for an PSCell
    physicalConfigDedicatedPSCell-r12   PhysicalConfigDedicated      OPTIONAL, -- Need ON
    sps-Config-r12                      SPS-Config                   OPTIONAL, -- Need ON
    naics-Info-r12                      NAICS-AssistanceInfo-r12     OPTIONAL, -- Need ON
    ...
}
```

After a SPS UL grant is configured, the MAC entity shall:
1> if twoIntervalsConfig is enabled by upper layer:
2> set the Subframe_Offset according to Table 3 below.

TABLE 3

| TDD UL/DL configuration | Position of initial Semi-Persistent grant | Subframe_Offset value (ms) |
| --- | --- | --- |
| 0 | N/A | 0 |
| 1 | Subframes 2 and 7 | 1 |
|   | Subframes 3 and 8 | −1 |
| 2 | Subframe 2 | 5 |
|   | Subframe 7 | −5 |
| 3 | Subframes 2 and 3 | 1 |
|   | Subframe 4 | −2 |
| 4 | Subframe 2 | 1 |
|   | Subframe 3 | −1 |
| 5 | N/A | 0 |
| 6 | N/A | 0 |

1> else:
2> set Subframe_Offset to 0.
1> consider sequentially that the $N^{th}$ grant occurs in the subframe for which:
2> (10*SFN+subframe)=[(10*$SFN_{start\ time}$+$subframe_{start\ time}$)+N*semiPersistSchedIntervalUL+Subframe_Offset*(N modulo 2)] modulo 10240, where $SFN_{start\ time}$ and $subframe_{start\ time}$ are the SFN and subframe, respectively, at the time the configured uplink grant were (re-)initialized.

The MAC entity shall clear the configured UL grant immediately after implicitReleaseAfter number of consecutive new MAC PDUs each containing zero MAC SDUs have been provided by the multiplexing and assembly entity, on the SPS resource.

Vehicle-to-everything (V2X) communication is described. V2X communication contains three different types, which are vehicle-to-vehicle (V2V) communications, vehicle-to-infrastructure (V2I) communications, and vehicle-to-pedestrian (V2P) communications. These three types of V2X can use "co-operative awareness" to provide more intelligent services for end-users. This means that transport entities, such as vehicles, roadside infrastructure, and pedestrians, can collect knowledge of their local environment (e.g. information received from other vehicles or sensor equipment in proximity) to process and share that knowledge in order to provide more intelligent services, such as cooperative collision warning or autonomous driving.

V2X service is a type of communication service that involves a transmitting or receiving UE using V2V application via 3GPP transport. Based on the other party involved in the communication, it can be further divided into V2V service, V2I service, V2P service, and vehicle-to-network (V2N) service. V2V service is a type of V2X service, where both parties of the communication are UEs using V2V application. V2I service is a type of V2X Service, where one party is a UE and the other party is a road side unit (RSU) both using V2I application. The RSU is an entity supporting V2I service that can transmit to, and receive from a UE using V2I application. RSU is implemented in an eNB or a stationary UE. V2P service is a type of V2X service, where both parties of the communication are UEs using V2P application. V2N service is a type of V2X Service, where one party is a UE and the other party is a serving entity, both using V2N applications and communicating with each other via LTE network entities.

For V2V, E-UTRAN allows such UEs that are in proximity of each other to exchange V2V-related information using E-UTRA(N) when permission, authorization and proximity criteria are fulfilled. The proximity criteria can be configured by the mobile network operator (MNO). However, UEs supporting V2V service can exchange such information when served by or not served by E-UTRAN which supports V2X Service. The UE supporting V2V applications transmits application layer information (e.g. about its location, dynamics, and attributes as part of the V2V service). The V2V payload must be flexible in order to accommodate different information contents, and the information can be transmitted periodically according to a configuration provided by the MNO. V2V is predominantly broadcast-based. V2V includes the exchange of V2V-related application information between distinct UEs directly and/or, due to the limited direct communication range of V2V, the exchange of V2V-related application information between distinct UEs via infrastructure supporting V2X service, e.g., RSU, application server, etc.

For V2I, the UE supporting V2I applications sends application layer information to RSU. RSU sends application layer information to a group of UEs or a UE supporting V2I applications. V2N is also introduced where one party is a UE and the other party is a serving entity, both supporting V2N applications and communicating with each other via LTE network.

For V2P, E-UTRAN allows such UEs that are in proximity of each other to exchange V2P-related information using E-UTRAN when permission, authorization and proximity criteria are fulfilled. The proximity criteria can be configured by the MNO. However, UEs supporting V2P service can exchange such information even when not served by E-UTRAN which supports V2X Service. The UE supporting V2P applications transmits application layer information. Such information can be broadcast by a vehicle with UE supporting V2X service (e.g., warning to pedestrian), and/or by a pedestrian with UE supporting V2X service (e.g., warning to vehicle). V2P includes the exchange of V2P-related application information between distinct UEs (one for vehicle and the other for pedestrian) directly and/or, due to the limited direct communication range of V2P, the exchange of V2P-related application information between distinct UEs via infrastructure supporting V2X service, e.g., RSU, application server, etc.

SPS resource allocation can provide efficient way of transmissions if user packets occur periodically and do not vary in size too frequently. However, if size of user packets varies too frequently, SPS resource allocation may not provide much efficiency. If size of MAC PDU varies too frequently, dynamic scheduling of resource allocation should frequently replace SPS resource allocation at a time because SPS resource is not sufficient to transmit a MAC PDU at a time. In summary, SPS resource allocation is not so beneficial when size of MAC PDU varies too frequently, so a method for configuring an additional resource which complements SPS resource may be required.

Hereinafter, a method for performing SPS transmission with a scheduling request according to the present invention is proposed. According to an embodiment of the present invention, the UE may be configured with a scheduling request specific to one or more specific logical channels, and the UE may activate SPS resource (which are periodical) specific to the specific logical channels. In this case, when the configured first UL or sidelink (SL) grant on the SPS resource cannot accommodate the amount of data available for transmission for all of the specific logical channels, the UE may trigger and transmit the scheduling request to the eNB. Upon receiving the second UL or SL grant specific to the specific logical channels according to the scheduling request, the UE may transmit one part of data on the first UL or SL grant on the SPS resource and remaining part of data on the second UL or SL grant. The eNB may indicate the specific logical channel(s) to the UE, e.g. by logical channel identifier(s). The specific logical channel(s) may correspond to the highest logical channel priority or the highest logical channel priorities. When the eNB indicates a value of the logical channel priority, all logical channels with a higher logical channel priority than the indicated logical channel priority and/or all logical channels with the indicated logical channel priority may be configured as the specific logical channels.

More specifically, according to an embodiment of the present invention, the UE may be configured with SPS resource and L1 control resource. The L1 control resource may be used to request additional/overriding resource over the SPS resource. The L1 control resource may be further used to request SPS activation. The L1 control resource may be periodically assigned or possibly once assigned at a certain period. The L1 control resource may be PUCCH resource or a new uplink control channel resource. In order to request additional/overriding resource, the SPS scheduling information may be transmitted on L1 control resource. The SPS scheduling information may be transmitted either a few subframes before transmission of data of the specific logical channel(s) on the SPS resource at a time period or in the same subframe where data of the specific logical channel(s) on the SPS resource is transmitted. The SPS scheduling information may be a scheduling request configured to the UE.

The UE may receive a SPS resource configuration (SPS-Config), described above in Table 1, which includes a L1 control resource configuration such as PUCCH configuration. While using the SPS resource according to the received SPS-Config, the UE may suspend or resume SPS resource configuration upon a specific event while keeping SPS configuration according to the SPS-Config.

The SPS resource and L1 control resource may correspond to UL resource, SL resource, or both. The present invention may be used only for UL SPS, only for SL SPS or for both of UL SPS and SL SPS. Further, the SPS resource (e.g. PUSCH resource or SL resource) and L1 control resource (e.g. PUCCH resource) may be exclusively used for V2X communication or V2X related channel. For example, all resources may be only used to transmit V2X messages, so that all resources may be granted only to carry data via one or more specific channel, e.g. such as a logical channel configured to transmit V2X messages. The specific channel may be one of UL channel, SL channel, or bi-directional channel which is applicable for both UL and SL transmissions.

Figure 6:
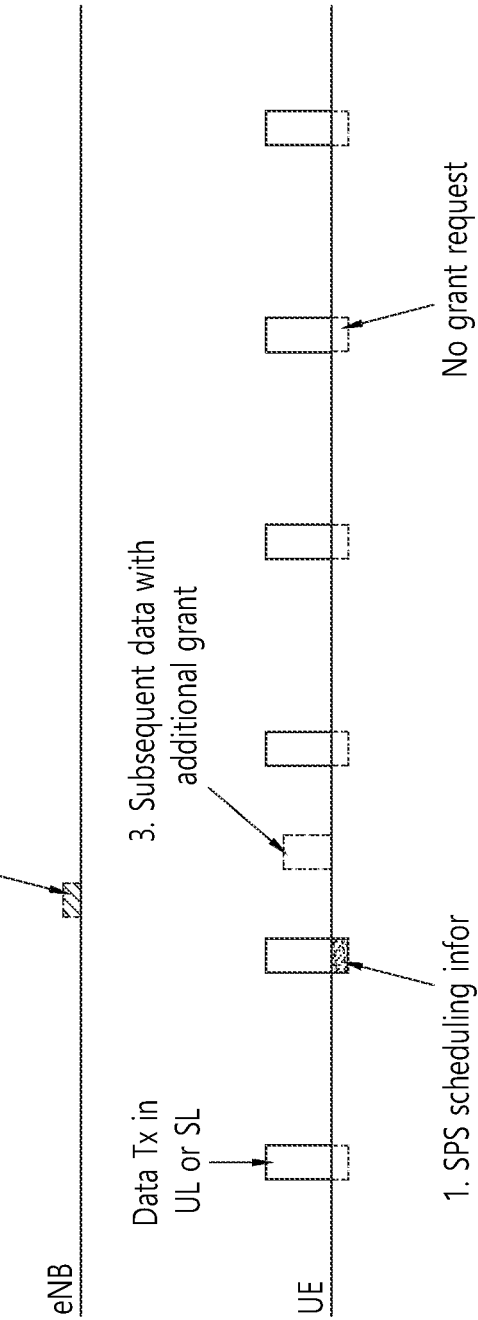
FIG. 6 shows an example of SPS transmission by using SPS resource and L1 control resource according to an embodiment of the present invention.

FIG. 6 shows an example of SPS transmission by using SPS resource and L1 control resource according to an embodiment of the present invention. FIG. 6 shows how the eNB/UE performs UL or SL transmission by using SPS resource and L1 control resource which are allocated at the same subframe. In this embodiment, the UE is configured with periodical SPS resource for data transmission and periodical L1 control resource for control transmission. Further, it is assumed that the SPS is activated. If the UE transmits SPS scheduling information, the UE uses L1 control resource. Otherwise, the UE may not use L1 control resource.

(1) Step 1

The UE transmits SPS scheduling information on the L1 control resource at a SPS scheduling interval. The L1 control resource used for transmission of the SPS scheduling information and SPS resource are allocated at the same subframe. The SPS scheduling information may be a scheduling request on PUCCH. The scheduling request may be used only for SPS or only for a specific logical channel(s). The specific logical channel may be one of UL channel, SL channel, or bi-directional channel which is applicable for both UL and SL.

The SPS scheduling information may be used for the UE to inform the eNB that additional resource over the SPS resource is requested for the corresponding SPS scheduling interval or for the next SPS scheduling interval, when additional resource than the configured SPS resource is needed to send data available for the specific logical channel(s).

Alternatively, the SPS scheduling information may be used for the UE to inform the eNB about an amount of additional data available for the specific logical channel(s) which do not include data transmitted on the SPS resource at the corresponding SPS scheduling interval or at the next SPS scheduling interval. In this case, if the eNB grants SL or UL resource receiving the SPS scheduling information, the UE may consider the granted resource as resource for additional data available for the specific logical channel(s). The eNB may grant SL resource when SL SPS is activated. The eNB may grant UL resource when UL SPS is activated.

Alternatively, the SPS scheduling information may be used for the UE to inform the eNB about an amount of total data available for the specific logical channel(s) which includes data transmitted on SPS resources at the corresponding SPS scheduling interval or at the next SPS scheduling interval. In this case, if the eNB grants SL or UL resource receiving the SPS scheduling information, the UE may consider the granted resource as total data available for the specific logical channel(s) so that the granted resource overrides the configured SPS grant. The eNB may grant SL or UL resource regardless of which direction SPS is activated in, i.e. either SL SPS or UL SPS.

Alternatively, the SPS scheduling information may be used for the UE to inform the eNB that no data is available for the specific logical channel(s) for the period, so that SPS resource granted for the corresponding SPS scheduling interval or for the next SPS scheduling interval is not used.

(2) Step 2

In this embodiment, it is assumed that the SPS scheduling information indicates an amount of additional data available for the specific logical channel(s). Upon receiving the SPS scheduling information indicating request of additional resource for the specific logical channel(s) (i.e. for V2X communication), the eNB grants either SL resource or UL resource to the UE. The eNB may grant SL resource when SL SPS is activated. The eNB may grant UL resource when UL SPS is activated.

(3) Step 3

Upon receiving the UL or SL grant for additional resource for the specific logical channel(s), the UE considers the granted resource as resource for additional data available for the specific logical channel(s). Accordingly, the UE can transmit subsequent data with the granted resource for additional data available for the specific logical channel(s).

Figure 7:
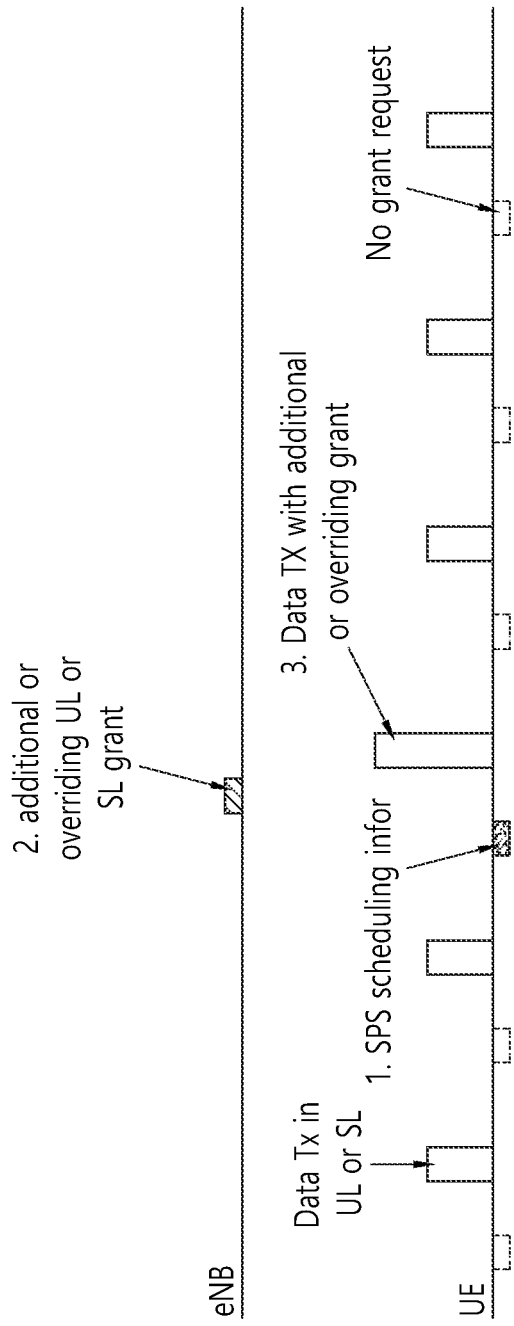
FIG. 7 shows another example of SPS transmission by using SPS resource and L1 control resource according to an embodiment of the present invention.

FIG. 7 shows another example of SPS transmission by using SPS resource and L1 control resource according to an embodiment of the present invention. FIG. 7 shows how the eNB/UE performs UL or SL transmission by using SPS resource and L1 control resource which are allocated at different subframes from each other. In this embodiment, the UE is configured with periodical SPS resource for data transmission and periodical L1 control resource for control transmission. Further, it is assumed that the SPS is activated. If the UE transmits SPS scheduling information, the UE uses L1 control resource. Otherwise, the UE may not use L1 control resource.

(1) Step 1

The UE transmits SPS scheduling information on the L1 control resource at a SPS scheduling interval. The L1 control resource used for transmission of the SPS scheduling information and SPS resource are allocated at different subframes from each other. The SPS scheduling information may be a scheduling request on PUCCH. The scheduling request may be used only for SPS or only for a specific logical channel(s). The specific logical channel may be one of UL channel, SL channel, or bi-directional channel which is applicable for both UL and SL.

The SPS scheduling information may be used for the UE to inform the eNB that additional resource over the SPS resource is requested for the corresponding SPS scheduling interval or for the next SPS scheduling interval, when additional resource than the configured SPS resource is needed to send data available for the specific logical channel(s).

Alternatively, the SPS scheduling information may be used for the UE to inform the eNB about an amount of additional data available for the specific logical channel(s) which do not include data transmitted on the SPS resource at the corresponding SPS scheduling interval or at the next SPS scheduling interval. In this case, if the eNB grants SL or UL resource receiving the SPS scheduling information, the UE may consider the granted resource as resource for additional data available for the specific logical channel(s). The eNB may grant SL resource when SL SPS is activated. The eNB may grant UL resource when UL SPS is activated.

Alternatively, the SPS scheduling information may be used for the UE to inform the eNB about an amount of total data available for the specific logical channel(s) which includes data transmitted on SPS resources at the corresponding SPS scheduling interval or at the next SPS scheduling interval. In this case, if the eNB grants SL or UL resource receiving the SPS scheduling information, the UE may consider the granted resource as total data available for the specific logical channel(s) so that the granted resource overrides the configured SPS grant. The eNB may grant SL or UL resource regardless of which direction SPS is activated in, i.e. either SL SPS or UL SPS.

Alternatively, the SPS scheduling information may be used for the UE to inform the eNB that no data is available for the specific logical channel(s) for the period, so that SPS resource granted for the corresponding SPS scheduling interval or for the next SPS scheduling interval is not used.

(2) Step 2

Upon receiving the SPS scheduling information indicating request of additional resource for the specific logical channel(s) (i.e. for V2X communication), the eNB grants either SL resource or UL resource to the UE. The eNB may grant SL resource when SL SPS is activated. The eNB may grant UL resource when UL SPS is activated. Or, the eNB may grant SL or UL resource regardless of which direction SPS is activated in, i.e. either SL SPS or UL SPS.

(3) Step 3

In this embodiment, it is assumed that the SPS scheduling information indicates an amount of total data available for the specific logical channel(s). Upon receiving the UL or SL grant for total resource for the specific logical channel(s), the UE considers the granted resource as resource for total data available for the specific logical channel(s) so that the granted resource overrides the configured SPS grant. Accordingly, the UE can transmit data with the additional or overriding grant for total data available for the specific logical channel(s).

Figure 8:
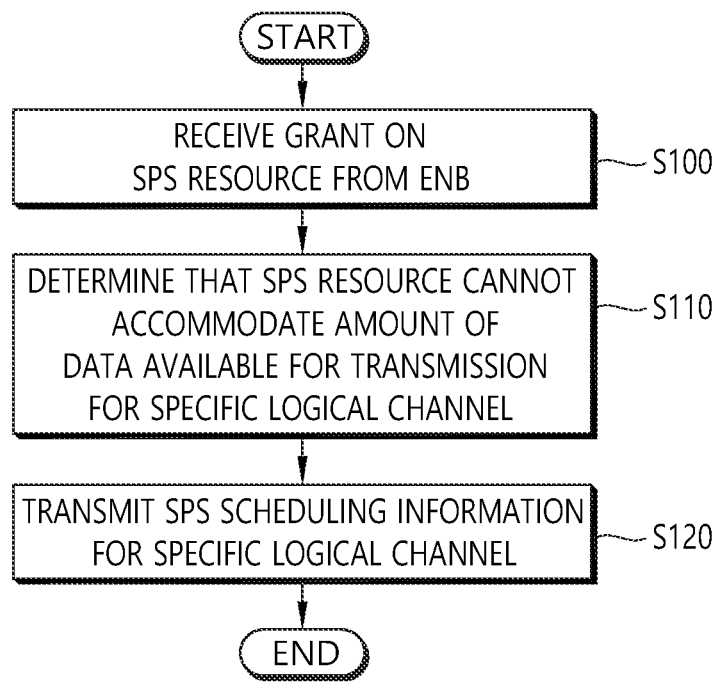
FIG. 8 shows a method for transmitting SPS scheduling information by a UE according to an embodiment of the present invention.

FIG. 8 shows a method for transmitting SPS scheduling information by a UE according to an embodiment of the present invention. The description of the present invention above may be applied to this embodiment.

In step S100, the UE receives a grant on a SPS resource from the eNB. The grant includes at least one of UL grant or SL grant.

In step S110, the UE determines that the SPS resource cannot accommodate an amount of data available for transmission for a specific logical channel. The specific logical channel may correspond to a highest logical channel priority. The specific logical channel may correspond to a V2X communication.

In step S120, the UE transmits the SPS scheduling information for the specific logical channel to the eNB. The SPS scheduling information for the specific logical channel may be a scheduling request for the specific logical channel. The SPS scheduling information may be transmitted on a L1 control resource. The L1 control resource may be configured by a L1 control resource configuration included in a SPS resource configuration. The SPS resource configuration may include a logical channel identifier for the specific logical channel. The L1 control resource may be periodically assigned or once assigned at a certain period.

The SPS scheduling information may indicate that additional resource over the SPS resource is requested for a corresponding SPS scheduling interval or for a next SPS scheduling interval. Or, the SPS scheduling information may indicate an amount of additional data available for the specific logical channel at a corresponding SPS scheduling interval or at a next SPS scheduling interval. Or, the SPS scheduling information may indicate an amount of total data available for the specific logical channel at a corresponding SPS scheduling interval or at a next SPS scheduling interval.

The UE may receive a grant on additional resource from the eNB, and transmit data to the eNB by using the SPS resource and the additional resource. Or, the UE may receive a grant on overriding resource from the eNB, and transmit data to the eNB by using the overriding resource.

Figure 9:
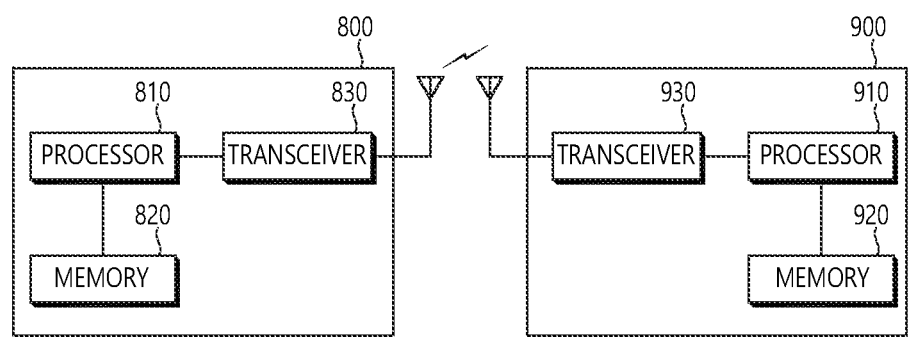
FIG. 9 shows a wireless communication system to implement an embodiment of the present invention.

FIG. 9 shows a wireless communication system to implement an embodiment of the present invention.

An eNB 800 includes a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A UE 900 includes a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method performed by a wireless device in a wireless communication system, the method comprising:
    receiving a first semi-persistent scheduling (SPS) configuration including a first SPS resource from a base station,
    wherein a logical channel is related to the first SPS resource;
    performing transmission of data available for the logical channel based on the first SPS resource;
    while performing the transmission based on the first SPS resource, and based on additional data for a logical channel being available, wherein the additional data does not include the data being transmitted on the first SPS resource, informing the base station about the additional data available for the logical channel; and
    receiving a second SPS resource from the base station,
    wherein the second SPS resource is for transmitting the additional data,
    wherein the second SPS resource is included in a dedicated radio resource configuration, and
    wherein the wireless device suspends the second SPS resource upon a specific event while keeping configuration of the second SPS resource.

2. The method of claim 1, wherein the informing the base station about the additional data available for the logical channel comprises:
    transmitting, to the base station, SPS scheduling information,
    wherein the SPS scheduling information informs that an uplink SPS resource is requested for data available for the logical channel.

3. The method of claim 2,
    wherein the SPS scheduling information is a scheduling request.

4. The method of claim 2,
    wherein the SPS scheduling information is transmitted on a Layer 1 (L1) control resource.

5. The method of claim 4,
    wherein the L1 control resource is configured by a L1 control resource configuration included in a SPS resource configuration.

6. The method of claim 4,
    wherein the dedicated resource configuration includes a logical channel identifier.

7. The method of claim 4,
    wherein the L1 control resource is periodically assigned or once assigned at a certain period.

8. The method of claim 1,
    wherein the wireless device is in communication with at least one of a user equipment, a network, or an autonomous vehicle other than the wireless device.

9. A wireless device in a wireless communication system comprising:
    a transceiver;
    a memory; and
    at least one processor operatively coupled to the transceiver and the memory, and configured to:
    control the transceiver to receive a first semi-persistent scheduling (SPS) configuration including a first SPS resource from a base station,
    wherein a logical channel is related to the first SPS resource;
    control the transceiver to perform transmission of data available for the logical channel based on the first SPS resource;
    while performing the transmission based on the first SPS resource, and based on additional data for a logical channel being available, wherein the additional data does not include the data being transmitted on the first SPS resource, control the transceiver to inform the base station about the additional data available for the logical channel; and
    control the transceiver to receive a second SPS resource from the base station,
    wherein the second SPS resource is for transmitting the additional data,
    wherein the second SPS resource is included in a dedicated radio resource configuration, and
    wherein the wireless device suspends the second SPS resource upon a specific event while keeping configuration of the second SPS resource.

10. The wireless device of claim 9, wherein the control the transceiver to inform the base station about the additional data available for the logical channel comprises:
    control the transceiver to transmit, to the base station, SPS scheduling information,
    wherein the SPS scheduling information informs that an uplink SPS resource is requested for data available for the logical channel.

11. The wireless device of claim 10,
    wherein the SPS scheduling information is a scheduling request.

12. The wireless device of claim 10,
    wherein the SPS scheduling information is transmitted on a Layer 1 (L1) control resource.

13. The wireless device of claim 12,
    wherein the L1 control resource is configured by a L1 control resource configuration included in a SPS resource configuration.

14. The wireless device of claim 12,
    wherein the dedicated resource configuration includes a logical channel identifier.

15. The wireless device of claim 12,
wherein the L1 control resource is periodically assigned or once assigned at a certain period.

16. The wireless device of claim 9,
wherein the wireless device is in communication with at least one of a user equipment, a network, or an autonomous vehicle other than the wireless device.

17. A non-transitory computer-readable medium having stored thereon a plurality of instructions, which, based on being executed by a processor of a wireless device, cause the wireless device to:
receive a first semi-persistent scheduling (SPS) configuration including a first SPS resource from a base station,
wherein a logical channel is related to the first SPS resource;
perform transmission of data available for the logical channel based on the first SPS resource;
while performing the transmission based on the first SPS resource, and based on additional data for a logical channel being available, wherein the additional data does not include the data being transmitted on the first SPS resource, inform the base station about the additional data available for the logical channel; and
receive a second SPS resource from the base station,
wherein the second SPS resource is for transmitting the additional data,
wherein the second SPS resource is included in a dedicated radio resource configuration, and
wherein the wireless device suspends the second SPS resource upon a specific event while keeping configuration of the second SPS resource.

18. The non-transitory computer-readable medium of claim 17, wherein the inform the base station about the additional data available for the logical channel comprises:
transmit, to the base station, SPS scheduling information,
wherein the SPS scheduling information informs that an uplink SPS resource is requested for data available for the logical channel.

19. The non-transitory computer-readable medium of claim 18,
wherein the SPS scheduling information is a scheduling request.

20. The non-transitory computer-readable medium of claim 18,
wherein the SPS scheduling information is transmitted on a Layer 1 (L1) control resource.

* * * * *